US009752786B2

(12) United States Patent
Armstrong et al.

(10) Patent No.: US 9,752,786 B2

(45) **Date of Patent: *Sep. 5, 2017**

(54) SENSING SYSTEM FOR A COOKTOP APPLIANCE WITH AIRFLOW PROTECTED SENSOR

(71) Applicant: General Electric Company, Schenectady, NY (US)

(72) Inventors: James Lee Armstrong, Louisville, KY (US); Joshua Stephen Wiseman, Elizabethtown, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 704 days.

This patent is subject to a terminal disclaimer.

(21) Appl. No.: 14/205,532

(22) Filed: Mar. 12, 2014

(65) Prior Publication Data

US 2015/0257591 A1 Sep. 17, 2015

(51) Int. Cl.

| | |
|---|---|
| ***F04D 27/00*** | (2006.01) |
| ***A47J 36/32*** | (2006.01) |
| ***F24C 15/20*** | (2006.01) |
| ***A47J 27/62*** | (2006.01) |
| ***H05B 6/64*** | (2006.01) |

(52) U.S. Cl.

CPC ........... *F24C 15/2042* (2013.01); *A47J 27/62* (2013.01); *F24C 15/2021* (2013.01); *H05B 6/6447* (2013.01)

(58) Field of Classification Search

CPC ........ F24C 15/20; F24C 15/2042; A21B 3/04; A21B 1/26; A47J 37/0664

USPC ........... 126/299 R, 299 D; 382/110; 219/704

See application file for complete search history.

(56) References Cited

U.S. PATENT DOCUMENTS

| | | | |
|---|---|---|---|
| 4,363,957 | A | 12/1982 | Tachikawa et al. |
| 5,693,248 | A | 12/1997 | Kim |
| 6,158,329 | A | 12/2000 | Schneider et al. |
| 6,376,812 | B2 | 4/2002 | Yamada et al. |
| 7,696,454 | B2 | 4/2010 | Nam et al. |
| 7,726,821 | B2 | 6/2010 | Bral |
| 8,096,944 | B2 | 1/2012 | Harrel |
| 8,208,043 | B2 | 6/2012 | Deng et al. |
| 2010/0102054 | A1 | 4/2010 | Fujinami et al. |
| 2010/0231506 | A1 | 9/2010 | Pryor |
| 2011/0134413 | A1 | 6/2011 | Has et al. |
| 2011/0253693 | A1 | 10/2011 | Lyons et al. |
| 2012/0099761 | A1 | 4/2012 | Yoon et al. |
| 2014/0174429 | A1 | 6/2014 | Fuhge |

FOREIGN PATENT DOCUMENTS

| | | |
|---|---|---|
| EP | 1505350 | 2/2010 |
| JP | 3307311 | 7/1999 |

OTHER PUBLICATIONS

Co-pending U.S. Appl. No. 14/258,071, filed Apr. 22, 2014.
Co-pending U.S. Appl. No. 14/205,521, filed Mar. 12, 2014.

*Primary Examiner* — Avinash Savani
*Assistant Examiner* — Rabeeul Zuberi
(74) *Attorney, Agent, or Firm* — Dority & Manning, P.A.

(57) ABSTRACT

The present invention provides an appliance with a sensor directed toward a cooking surface positioned beneath the sensor. One or more features are provided for directing a flow of air across the sensing end of the sensor to protect or shield it during cooking operations.

19 Claims, 9 Drawing Sheets

FIG. –2–

SENSING SYSTEM FOR A COOKTOP APPLIANCE WITH AIRFLOW PROTECTED SENSOR

FIELD OF THE INVENTION

The subject matter of the present disclosure relates generally to methods and systems for monitoring the cooktop of an oven range appliance.

BACKGROUND OF THE INVENTION

Over-the-range microwave appliances are generally mounted above a cooktop of an oven range appliance. Conventionally, cooktop appliances have been largely dependent upon a user monitoring the cooktop during use to determine, e.g., whether a pot of water is boiling or if a spill-over has occurred. There may be times, however, when a user may not be able to monitor the cooktop during use. Accordingly, a sensor may be contained in a sensor housing mounted over the range, e.g., on an over-the-range microwave appliance to monitor the cooktop positioned beneath the sensor.

However, a sensor mounted above the cooktop could become contaminated by, e.g., grease and moisture generated during use of the cooktop, which could impede the ability of the sensor to sense the cooktop. Thus, the sensor should be kept free from contamination by protection of the sensor lens.

In addition to providing for heating of food and beverage items, certain over-the-range microwave appliances include an air circulation system. When activated, the circulation system can draw fumes, smoke, grease, and/or steam away from the cooktop of the oven range appliance. Circulation systems generally include a fan for drawing a flow of air into the circulation system and a pathway for the flow of air. Additional fans or other elements may work with the circulation system to enhance the flow of air through the pathway or other components, such as the sensor housing. Therefore, the microwave appliance may provide a flow of air for keeping the sensor free from contamination.

Accordingly, a system for sensing a cooktop positioned beneath the system would be useful. In particular, such a system with features for keeping the sensor free from contamination would be advantageous. A system incorporated into an appliance, such as e.g., microwave appliance, would be useful.

BRIEF DESCRIPTION OF THE INVENTION

The present invention provides an appliance with a sensor directed toward a cooking surface positioned beneath the sensor. One or more features are provided for directing a flow of air across the sensing end of the sensor to protect or shield it during cooking operations. Additional aspects and advantages of the invention will be set forth in part in the following description, may be apparent from the description, or may be learned through practice of the invention.

In a first exemplary embodiment, the appliance includes a cooling air system and a sensor system. The cooling air system includes a pathway for a flow of air for cooling that has an air inlet and an air outlet. The cooling system also includes a cooling fan configured to cause air to flow along the pathway from the air inlet to the air outlet. The sensor system is supported by the appliance and includes an outer housing defining a chamber that is in fluid communication with the pathway. An inner housing is positioned in the chamber. The inner housing and the outer housing define a channel therebetween for a flow of air. The channel has a channel inlet and a channel outlet, and the channel inlet is positioned downstream of the cooling fan and is in fluid communication with the pathway to receive air flow from the cooling fan. The inner housing also defines a sensor aperture. A sensor is positioned in the inner housing, and the sensor has a sensing end positioned at the sensor aperture such that air flowing from the channel outlet flows past the sensing end of the sensor.

In a second exemplary embodiment, the appliance includes a cooling air system and a sensor system. The cooling air system includes a pathway for a flow of air for cooling that has an air inlet and an air outlet. The sensor system is supported by the appliance and includes an outer housing defining a chamber that is in fluid communication with the pathway. An inner housing is positioned in the chamber. The inner housing and the outer housing define a channel therebetween for a flow of air. The channel has a channel inlet and a channel outlet, and the channel inlet is in fluid communication with the pathway. The inner housing also defines a sensor aperture. A sensor is positioned in the inner housing, and the sensor has a sensing end positioned at the sensor aperture such that air flowing from the channel outlet flows past the sensing end of the sensor. The sensor system also includes a sensor fan positioned within the chamber adjacent the channel inlet, and the sensor fan is configured for creating a flow of air through the channel.

In a third exemplary embodiment, the appliance includes a cooling air system and a sensor system. The cooling air system includes a pathway for a flow of air for cooling that has an air inlet and an air outlet. The cooling system also includes a cooling fan configured to cause air to flow along the pathway from the air inlet to the air outlet. The sensor system is supported by the appliance and includes an outer housing defining a chamber that is in fluid communication with the pathway. A rotatable housing is positioned within the chamber and is in fluid communication with the chamber. The rotatable housing is also rotatable with respect to the outer housing. An inner housing is positioned within the rotatable housing. The inner housing and the rotatable housing define a channel therebetween for a flow of air. The channel has a channel inlet and a channel outlet, and the channel inlet is positioned downstream of the cooling fan and is in fluid communication with the pathway to receive air flow from the cooling fan. The inner housing also defines a sensor aperture. A sensor is positioned in the inner housing, and the sensor has a sensing end positioned at the sensor aperture such that air flowing from the channel outlet flows past the sensing end of the sensor.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Use of the same reference numerals in different figures denotes the same or similar features.

DETAILED DESCRIPTION OF THE INVENTION

Figure 1:
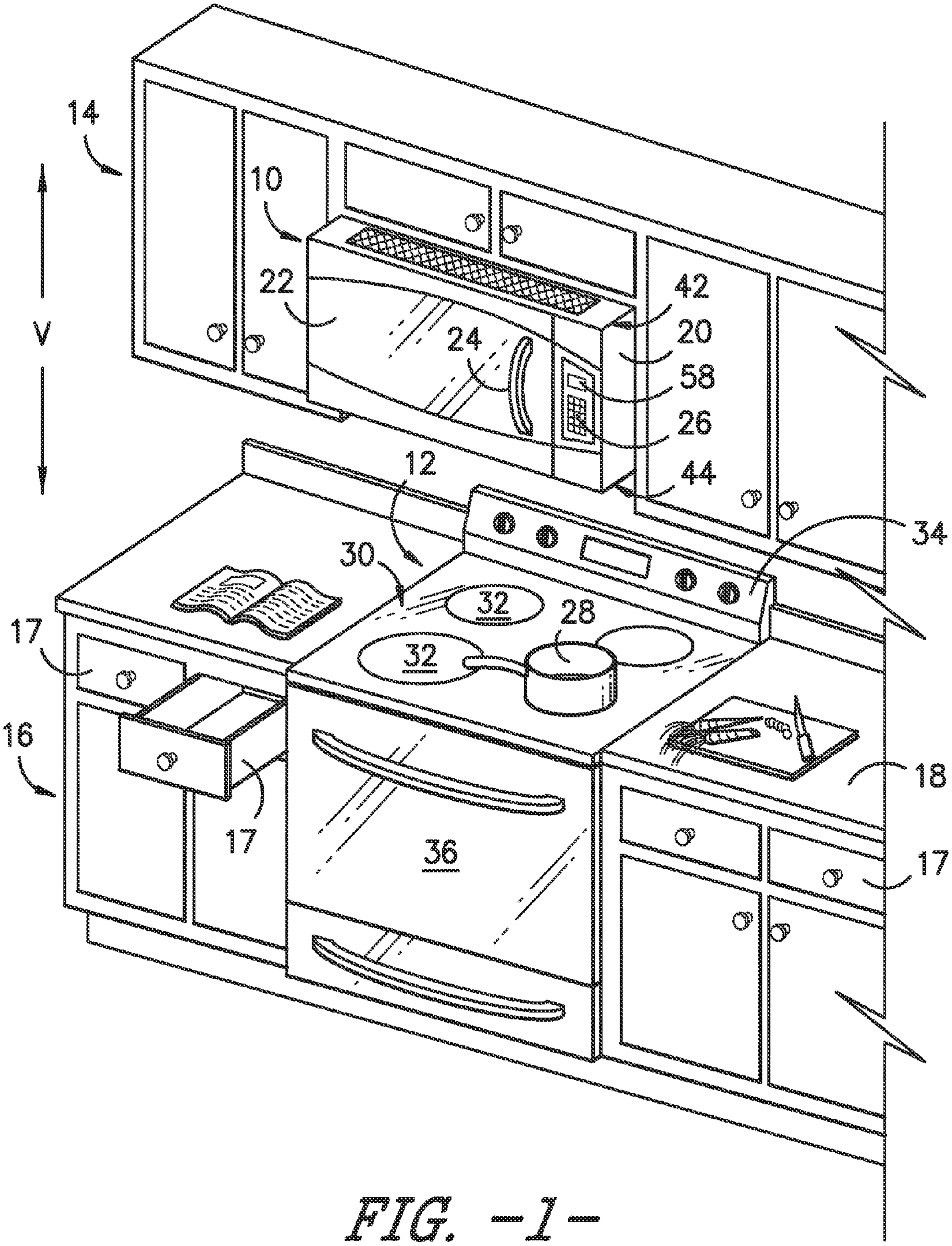
FIG. 1 provides a perspective view of a microwave appliance according to an exemplary embodiment of the present subject matter mounted to a kitchen cabinet above an oven range appliance.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a perspective view of a microwave appliance 10 according to an exemplary embodiment of the present subject matter mounted to an upper set of kitchen cabinets 14 above an oven range appliance 12, e.g., along a vertical direction V. Microwave appliance 10 shown in FIG. 1 is commonly referred to as an over-the-range microwave. It should be understood that, in alternative embodiments, the present subject matter may be used in any other suitable appliance, such as, e.g., a range hood, or may be used with a sensor positioned over the cooktop.

Upper set of kitchen cabinets 14 is positioned above a base set of kitchen cabinets 16, e.g., along the vertical direction V. Base set of kitchen cabinets 16 includes countertops 18 and drawers 17. Oven range appliance 12 is received within base set of kitchen cabinets 16 below microwave appliance 10. In particular, a cooking surface 30 of oven range appliance 12 is positioned, e.g., directly, below microwave appliance 10 along the vertical direction V. Microwave appliance 10 can include features such as an air handler or fan 52 (FIG. 2) that can draw cooking vapors and/or smoke away from cooking surface 30 and out of the kitchen containing microwave and oven range appliances 10 and 12.

Microwave appliance 10 is configured for receipt of food items for cooking. In particular, microwave appliance 10 includes a cabinet or casing 20 and a door 22 that permits selective access to an interior of microwave appliance 10 and casing 20. Door 22 includes a handle 24 that a user can pull to open door 22 to insert food items into microwave appliance 10. Microwave appliance 10 also includes controls 26 that permit a user to make selections for cooking of food items, e.g., a duration of a cooking cycle of microwave appliance 10 and/or a power setting for the cooking cycle of microwave appliance 10.

Oven range appliance 12 includes cooking surface 30. Cooking surface 30 includes heated portions 32 that may be heated by heating elements (not shown), e.g., electrical resistive heating elements, gas burners, induction heating elements, and/or any other suitable heating element or combination of heating elements. Oven range appliance 12 also includes a door 36 that permits access to a heated compartment (not shown) of oven range appliance 12, e.g., for cooking or baking of food items therein. A control panel 34 of oven range appliance 12 can permit a user to make selections for cooking of food items, e.g., a duration of a cooking cycle of oven range appliance 12 and/or a power setting for the cooking cycle of oven range appliance 12.

Figure 2:
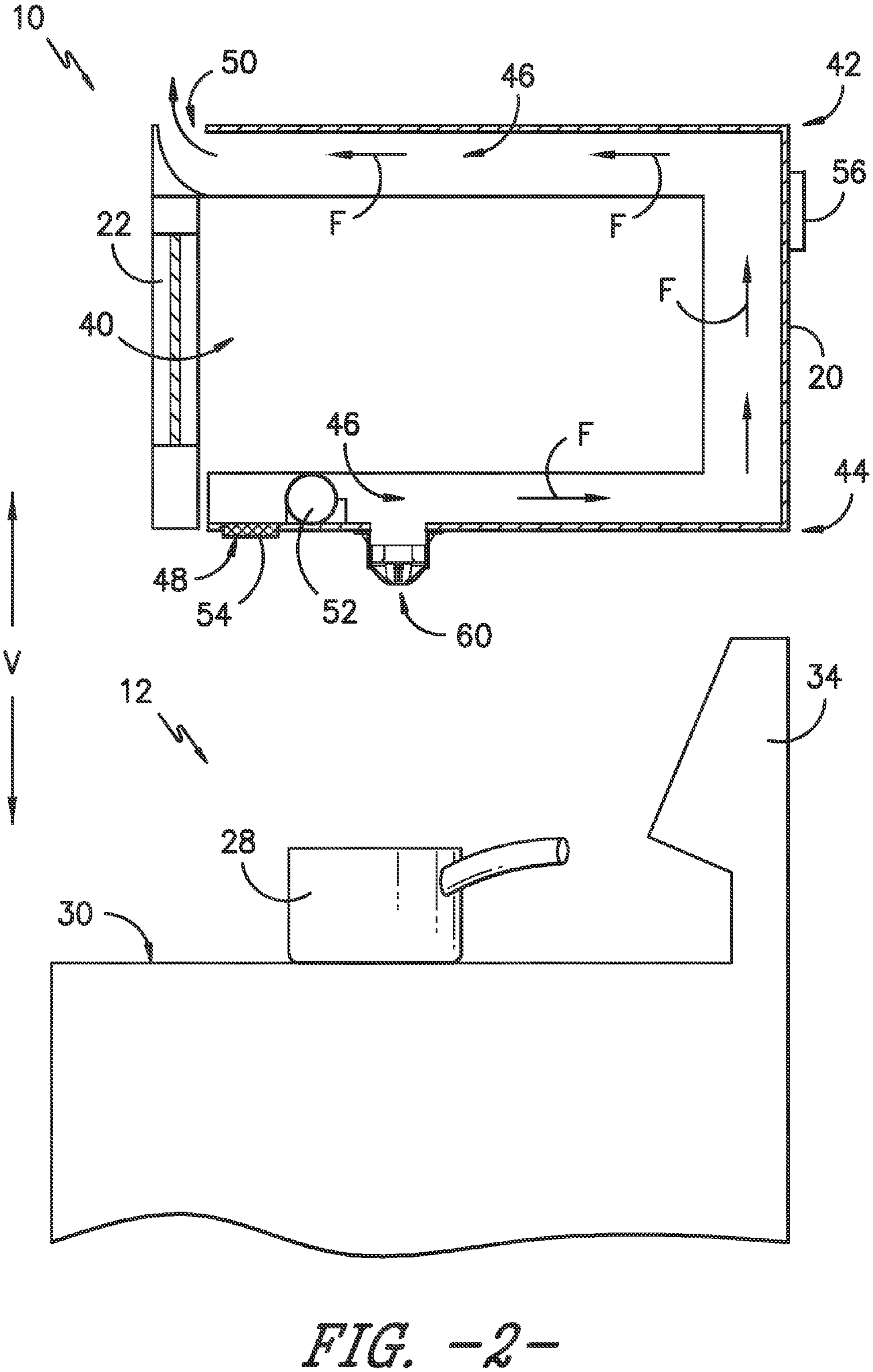
FIG. 2 provides a side, section view of an exemplary microwave appliance and oven range appliance in accordance with one exemplary embodiment of the present disclosure.

FIG. 2 provides a side, section view of microwave appliance 10 and oven range appliance 12. As illustrated, casing 20 extends between a top portion 42 and a bottom portion 44, e.g., along the vertical direction V. Thus, top and bottom portions 42 and 44 of casing 20 are spaced apart from each other, e.g., along the vertical direction V. Casing 20 defines a cooking chamber 40 configured for receipt of food items for cooking. Door 22 of microwave appliance 10 permits selective access to cooking chamber 40 of casing 20. In particular, door 22 of microwave appliance 10 is selectively adjustable between an open position (not shown) and a closed position (FIGS. 1 and 2). In the closed position, door 22 of microwave appliance 10 hinders access to cooking chamber 40 of casing 20. Conversely, door 22 of microwave appliance 10 permits access to cooking chamber 40 of casing 20 in the open position. A user can pull on handle 24 of door 22 of microwave appliance 10 in order to shift door 22 from the closed position shown in FIG. 2 to the open position.

Casing 20 also defines a cooling air pathway or conduit 46. Pathway 46 has an inlet 48 and an outlet 50. Pathway 46 extends between inlet 48 and outlet 50. Inlet 48 of pathway 46 is positioned at or adjacent bottom portion 44 of casing 20, e.g., such that inlet 48 of pathway 46 faces cooking surface 30 of oven range appliance 12. Conversely, outlet 50 of pathway 46 is positioned at or adjacent top portion 42 of casing 20, e.g., such that outlet 50 of pathway 46 faces away from cooking surface 30 of oven range appliance 12. Outlet 50 could face in other direction as well, although preferably not toward cooking surface 30. Thus, inlet 48 and outlet 50 of pathway 46 are spaced apart from each other, e.g., along the vertical direction V.

Microwave appliance 10 also includes a cooling fan 52, such as an axial fan or a radial fan. Fan 52 is positioned within or adjacent pathway 46. Fan 52 draws or urges a flow of air (shown with arrows F) through pathway 46 when fan 52 is in an activated state. Conversely, fan 52 does not draw or urge flow of air F through pathway 46 when fan 52 is in a deactivated state. When fan 52 is in the activated state, flow of air F enters pathway 46 at or through inlet 48 of pathway 46. Flow of air F is directed through pathway 46 to outlet 50, and flow of air F can exit pathway 46 at outlet 50 of pathway 46.

As may be seen in FIG. 2, microwave appliance 10 may further include a controller 56. Operation of microwave appliance 10 may be regulated by controller 56. Controller 56 is operatively coupled or in communication with various components of microwave appliance 10, including controls 26. In response to user manipulation of controls 26, controller 56 operates the various components of microwave appliance 10 to execute selected cycles and features.

Controller 56 may include a memory and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 56 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Controls 26 and other components of microwave appliance 10 may be in communication with controller 56 via one or more signal lines or shared communication busses.

Controller 56 may also be in operative communication with cooling air fan 52. Thus, controller 56 can selectively adjust cooling fan 52 between the activated and deactivated states to regulate the flow of air F through pathway 46.

Additionally, microwave appliance 10 may support a sensor system 60 such that cooking surface 30 is positioned beneath sensor system 60. Sensor system 60 includes a sensor 62 for monitoring cooking surface 30 and any cooking utensils containing food items for cooking, such as, e.g., cooking utensil 28, on cooking surface 30. More particularly, sensor 62 is configured, e.g., to detect whether a cooking utensil is present on cooking surface 30 and, if so, to provide a signal indicative of the same to controller 56. Sensor 62 may also be equipped with other features such as, e.g., the ability to determine (and provide a signal indicative of) the temperature of the cooktop, a utensil placed on the cooktop, and/or food present on the cooktop. Sensor 62 may be an optical sensor or any other sensor suitable for monitoring cooking surface 30. Further, sensor 62 may be in operative communication with controller 56, which may output an indicator signal to, e.g., a controls display 58 of microwave appliance 10 or another suitable source to alert a user to the status of cooking surface 30 or food items within cooking utensils 28 on cooking surface 30.

As shown in FIG. 2, sensor system 60 is in fluid communication with pathway 46. More particularly, air flowing through pathway 46 also causes air to flow through sensor system 60 as will be further described.

Figure 3:
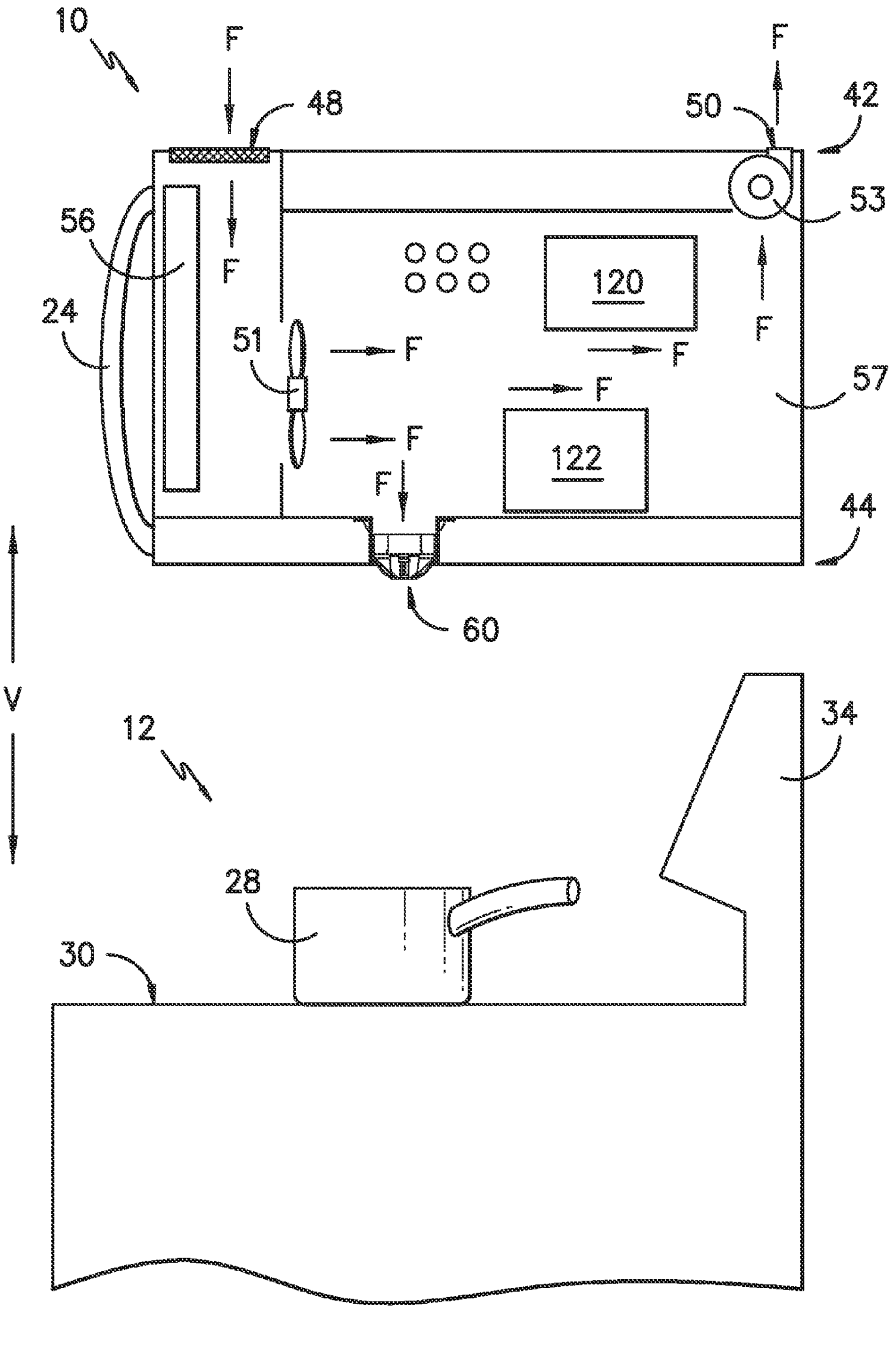
FIG. 3 provides a side, section view of an exemplary microwave appliance and oven range appliance in accordance with another exemplary embodiment of the present disclosure.

It should be understood that, in alternative embodiments, sensor system 60 could be positioned at other locations on microwave appliance 10 or could be supported by any other suitable appliance or surface, such as, e.g., a range hood or upper cabinets 14. As an example, in the exemplary embodiment illustrated in FIG. 3, microwave appliance 10 includes a microwave fan 51 that creates a flow of air F through the controls compartment 57, in which controller 56 is positioned. More particularly, microwave fan 51 draws air through inlet 48 and past controller 56, magnetron 120, and power supply 122. Additionally, an exhaust fan 53 draws or urges air flow F to exit controls compartment 57 through outlet 50. Sensor system 60 is in fluid communication with controls compartment 57 such that air flowing through controls compartment 57 also causes air to flow through sensor system 60 as will be described. Other configurations of microwave appliance 10 and sensor system 60 may also be used, or sensor system 60 could be supported by any other suitable appliance or surface.

Figure 4:
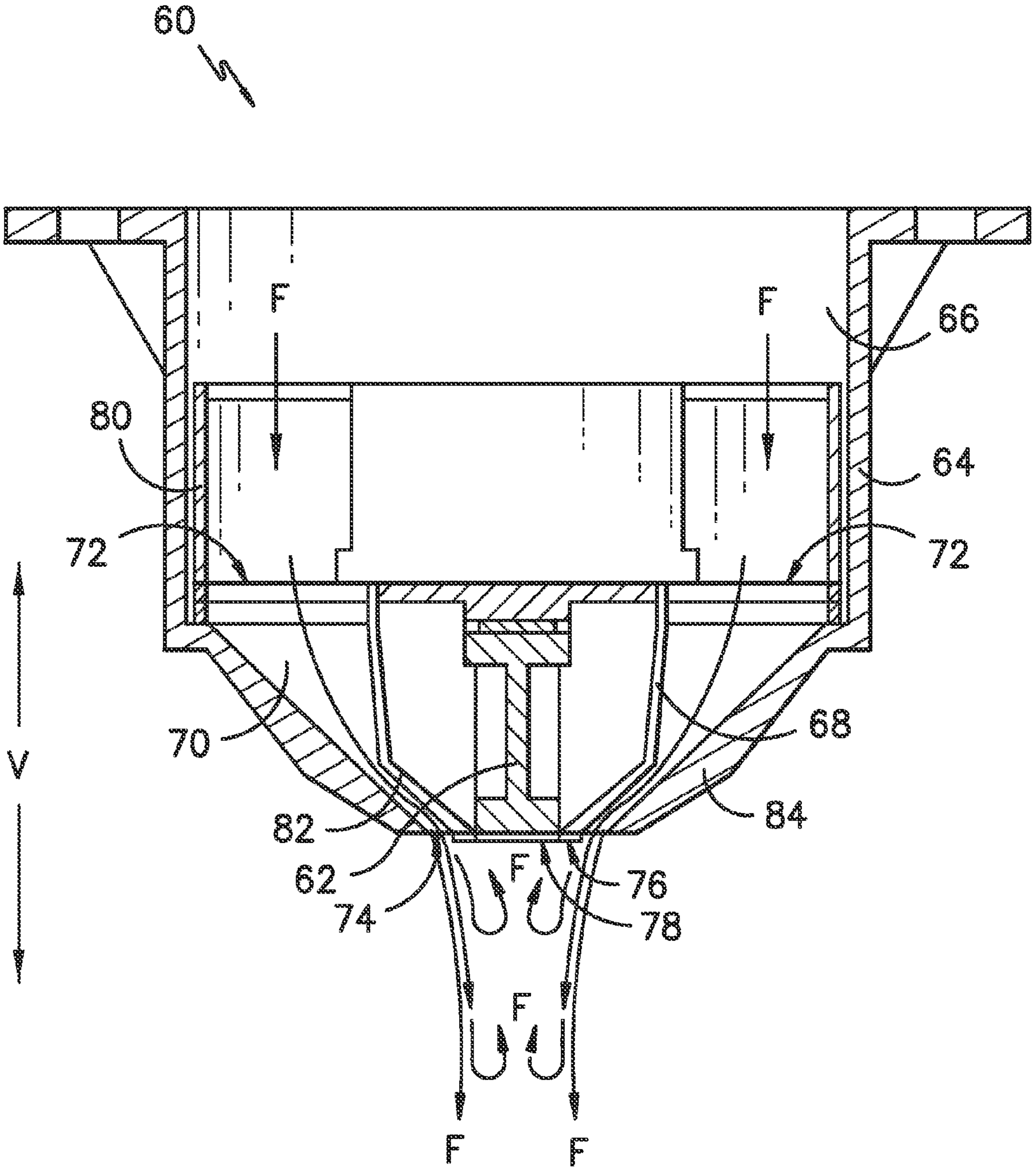
FIG. 4 provides a section view of an exemplary sensor system of the present disclosure.

Referring now to FIG. 4, in an exemplary embodiment, sensor 62 of sensor system 60 is contained within an inner housing 68 that is positioned within an outer housing 64. Outer housing 64 defines a chamber 66 that is in fluid communication with pathway 46. Inner housing 68 is positioned within chamber 66 such that inner housing 68 and outer housing 64 define a channel 70 for a flow of air F. Moreover, the inner housing defines a sensor aperture 76, and the sensing end 78 of sensor 62 is positioned at the sensor aperture 76. Sensor aperture 76 may be open or may have a protective covering such as, e.g., a glass lens.

The channel 70 has a channel inlet 72 positioned downstream of cooling fan 52 and in fluid communication with chamber 66 to receive a flow of air F from pathway 46. Further, channel 70 has a channel outlet 74 from which the flow of air F flows past the sensing end 78 of sensor 62. The flow of air F acts to protect the sensing end 78 by blowing away, e.g., moisture, grease, or other contaminants generated during use of the cooking surface 30 that might otherwise block or impede the proper operation of sensor 62.

Figure 5:
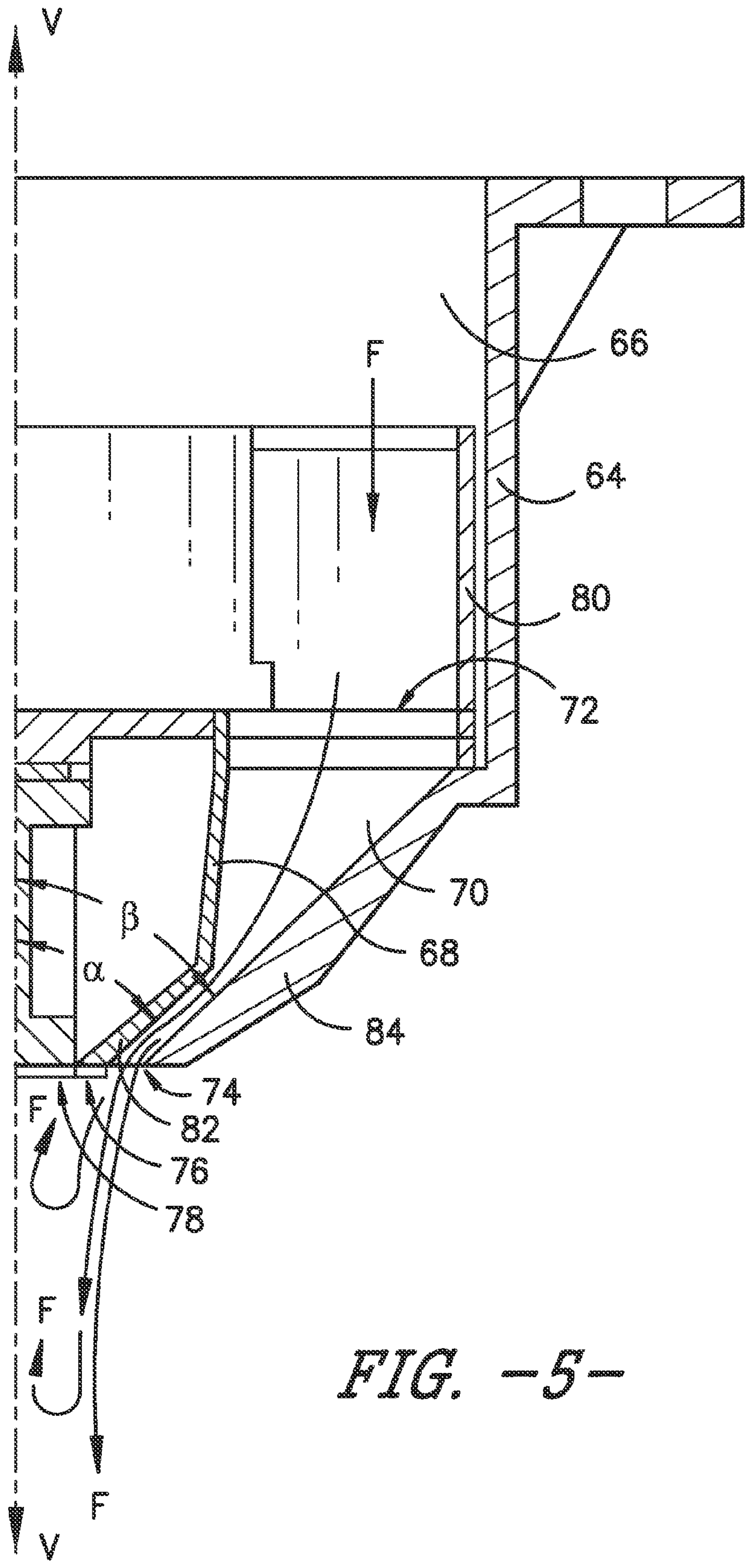
FIG. 5 provides a section view of an alternative exemplary embodiment of the sensor system of the present disclosure.

As illustrated in FIG. 5, channel 70 may be defined by an angled inner portion 82 of inner housing 68 and an angled outer portion 84 of outer housing 64. Angled inner portion 82 is positioned at an angle α with respect to the vertical direction and angled outer portion 84 is positioned at an angle β with respect to the vertical direction. Angled inner portion 82 and angled outer portion 84 direct the flow of air F past the sensing end 78 of sensor 62 to keep the sensing end 78 free from contamination. In one exemplary embodiment, angles α and β are in a range of about 30 to about 60 degrees. In still another embodiment, angles α and β are about 45 degrees. Other values for angles α and β may be used as well.

As shown in FIGS. 4 and 5, in certain embodiments of the invention, a sensor fan 80 is positioned within chamber 66 of outer housing 68 adjacent channel inlet 72. Sensor fan 80 may be used in addition to fan 52 to create air flow F or may be used instead of fan 52 to create air flow F. The sensor fan 80 is in operative communication with controller 56 and is configured to create a flow of air F through channel 70 and past sensing end 78 of sensor 62 to keep the sensing end 78 free from contamination. Sensor fan 80 may be used in addition to an air flow created by fan 52 or may be used separately from the operation of fan 52. Alternatively, where sensor system 60 is not mounted onto another appliance such a microwave 10 having a fan for air flow, sensor fan 80 can be used to provide the proper air flow F.

Figure 6:
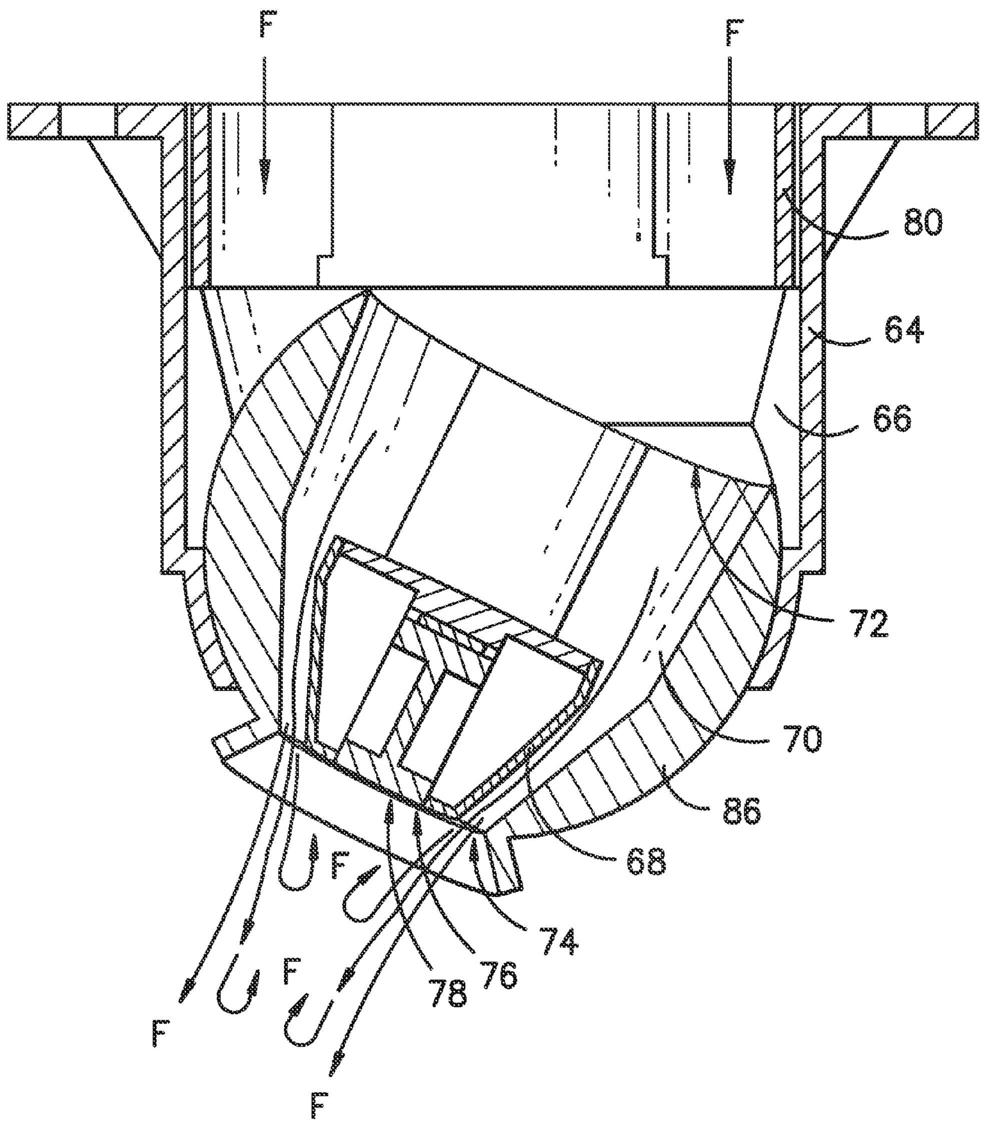
FIG. 6 provides a section view of an alternative exemplary embodiment of the sensor system of the present disclosure.

Referring now to FIG. 6, which uses the same reference numerals to denote the same or similar features, in another exemplary embodiment of the invention, the sensor system 60 includes a rotatable housing 86 positioned within chamber 66 of outer housing 64. In this embodiment, inner housing 68 is positioned within rotatable housing 86. Rotatable housing 86 is manually rotatable such that a user of the microwave appliance 10 may position the sensing end 78 of sensor 62 in a desired position.

Further, rotatable housing 86 and inner housing 68 define channel 70 for the flow of air F. Channel inlet 72 of channel 70 is positioned downstream of cooling fan 52 to receive a flow of air F from pathway 46 such that air flows out of channel outlet 74 and past sensing end 78. In yet another embodiment, sensor system 60 includes a sensor fan 80 in operative communication with controller 56 and positioned in chamber 66 adjacent channel inlet 72 to create a flow of air F through channel 70 and past sensing end 78. Sensor fan 80 may be used in addition to an air flow created by fan 52 or may be used separately from the operation of fan 52. Alternatively, where sensor system 60 is not mounted onto another appliance such a microwave 10 having a fan for air flow, sensor fan 80 can be used to provide the proper air flow F.

Figure 7:
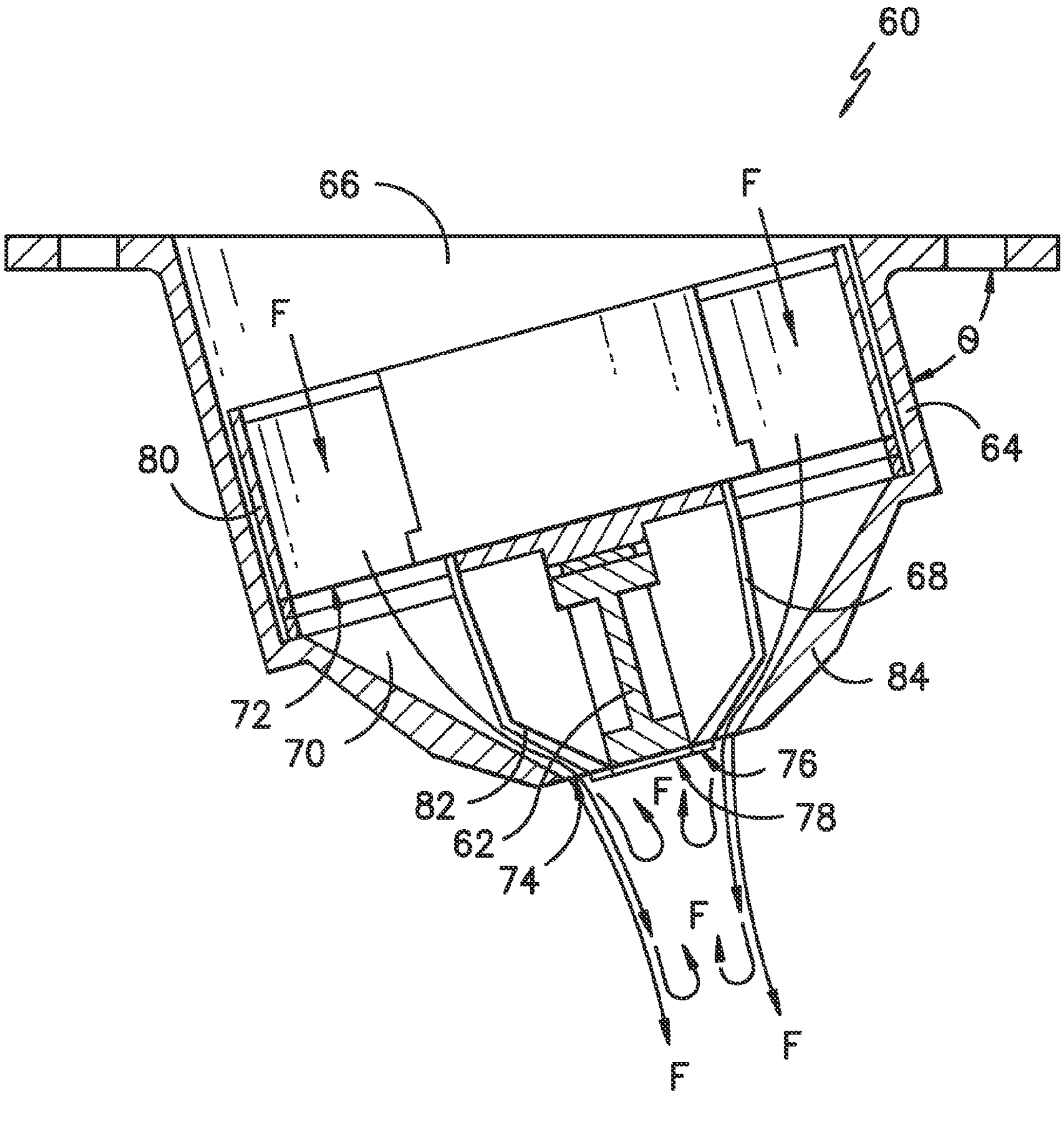
FIG. 7 provides a section view of another alternative exemplary embodiment of the sensor system of the present disclosure.

As shown in FIG. 7, which uses the same reference numerals to denote the same or similar features, in still other exemplary embodiments of the invention, the sensor system 60 may be angled with respect to the microwave appliance. More particularly, outer housing 64 is positioned at a non-orthogonal angle θ with respect to the lower portion 44 of microwave appliance 10. In one exemplary embodiment, angle θ is in a range of about 30 to about 60 degrees. In still another embodiment, angle θ is about 45 degrees. Other values for angle θ may be used as well.

Further, as illustrated in FIG. 7, inner housing 68 is positioned within chamber 66 of outer housing 64 such that inner housing 68 and outer housing 64 define channel 70 to direct a flow of air F past the sensing end 78 of sensor 62. Channel 70 includes channel inlet 72 positioned downstream from cooling fan 52 to receive a flow of air from pathway 46. Alternatively, or in addition thereto, sensor fan 80 may be in operative communication with controller 56 and may be positioned within chamber 66 adjacent channel inlet 72 to provide a flow of air F through channel 70 and past sensing end 78.

Figure 8:
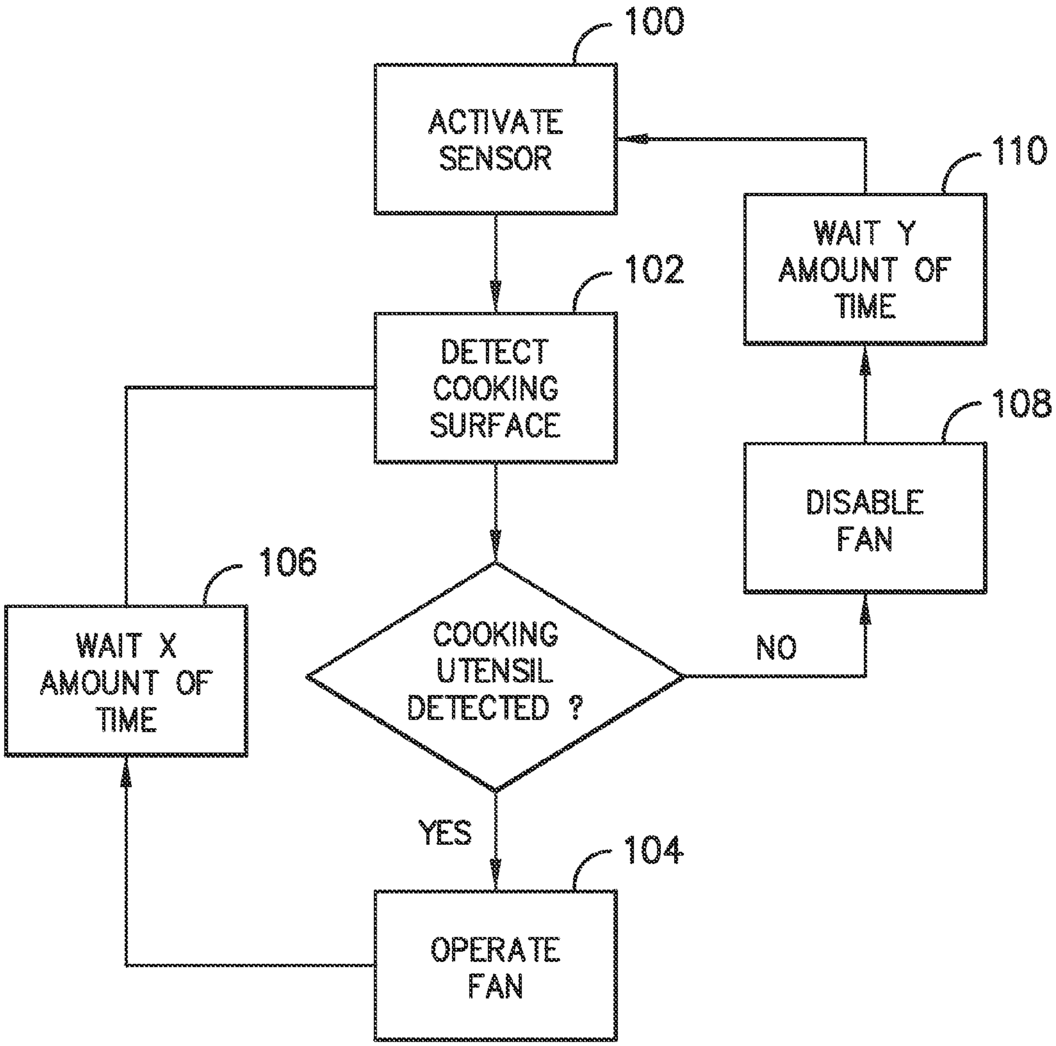
FIG. 8 illustrates a method of operating a sensor in accordance with one exemplary embodiment of the present subject matter.

Referring now to FIG. 8, the present disclosure is further directed to methods for operating sensor 62. A method may include, for example, the step 100 of activating sensor 62 with controller 56, and the step 102 of detecting the cooking surface 30 to determine if a cooking utensil 28 is on cooking surface 30, as discussed above. Step 102 may be performed by the controller 56, e.g., by running a detecting algorithm. If a cooking utensil 28 is detected on cooking surface 30, the method includes the step 104 of operating fan 52 to provide a flow of air F through channel 70 and past sensing end 78 of sensor 62, as discussed above. The method includes step 106 of waiting a programmed period of time X. Step 102 may be repeated after step 106 to determine if the cooking utensil is still on cooking surface 30. If no cooking utensil 28 is detected on cooking surface 30, the method includes the step 108 of disabling fan 52 and the step 110 of waiting a programmed period of time Y before reactivating sensor 62 to determine if a cooking utensil is present.

Figure 9:
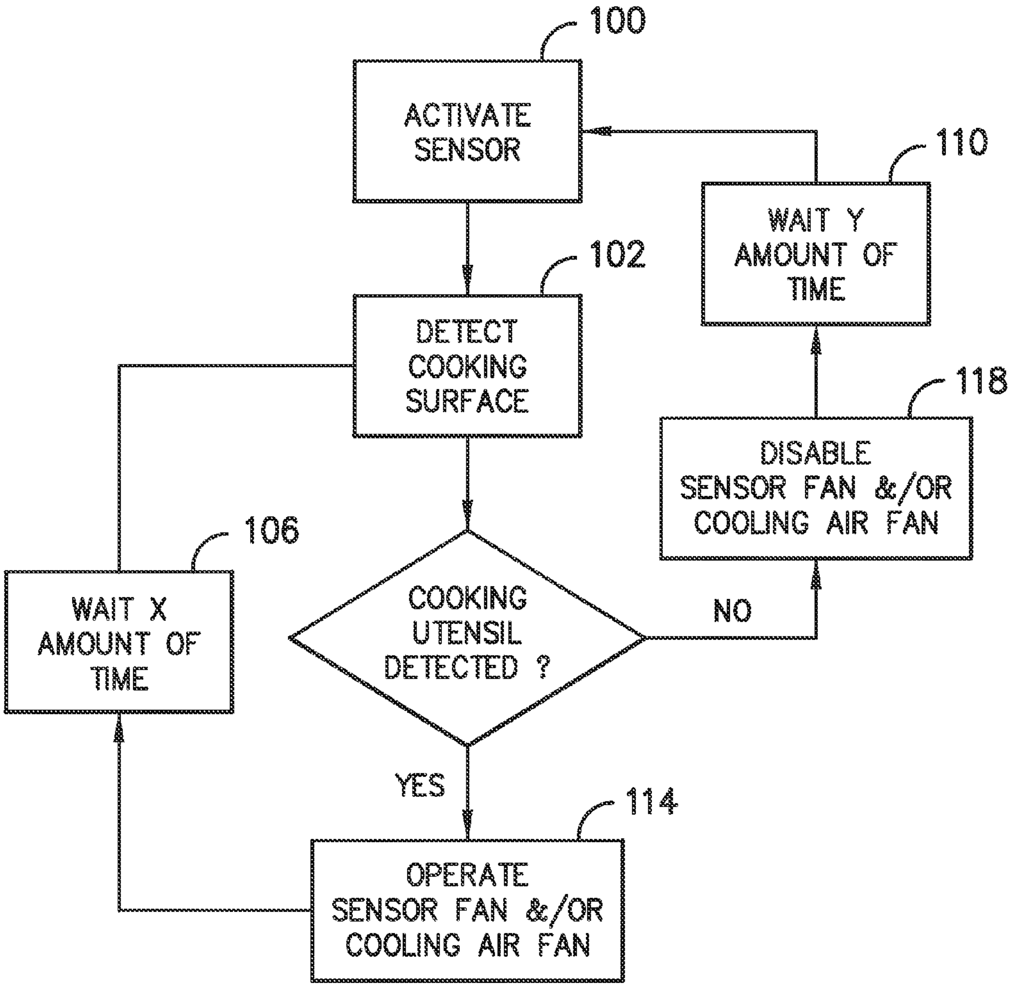
FIG. 9 illustrates a method of operating a sensor in accordance with another exemplary embodiment of the present subject matter.

The present invention also includes embodiments where a sensor fan 80 is used in addition to fan 52 or instead of fan 52. Referring now to FIG. 9, for example, the present invention can include the step 100 of activating sensor 62 with controller 56, and the step 102 of detecting the cooking surface 30 to determine if a cooking utensil 28 is on cooking surface 30, as discussed above. Step 102 may be performed by the controller 56, e.g., by running a detecting algorithm. If a cooking utensil 28 is detected on cooking surface 30, the method includes the step 114 of operating fan 52, sensor fan 80, or both, to provide a flow of air F through channel 70 and past sensing end 78 of sensor 62, as discussed above. The method includes step 106 of waiting a programmed period of time X. Step 102 may be repeated after step 106 to determine if the cooking utensil is still on cooking surface 30. If no cooking utensil 28 is detected on cooking surface 30, the method includes the step 118 of disabling fan 52 and/or sensor fan 80 and the step 110 of waiting a programmed period of time Y before reactivating sensor 62 to determine if a cooking utensil is present.

Additionally, microwave appliance 10 may include features, e.g., controls 26 or other suitable features, to allow a user of the microwave appliance to program the period of time X and period of time Y. By way of additional example, controller 56 and sensor 62 may also be configured to operate fan 52 and/or sensor fan 80 only once a certain temperature on cooking surface 30 is detected.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. An appliance defining vertical, transverse, and lateral directions that are perpendicular to each other, the appliance comprising:

- a cooling air system comprising
  - a pathway for a flow of air for cooling, the pathway having an air inlet and an air outlet; and
  - a cooling fan configured for causing air to flow along the pathway from the air inlet to the air outlet;
- a sensor system supported by the appliance, the sensor system and the appliance positioned vertically above a cooking surface of a cooktop range appliance, the sensor system comprising
  - an outer housing defining a chamber, the chamber in fluid communication with the pathway;
  - an inner housing positioned within the chamber, the inner housing and the outer housing defining a channel therebetween for a flow of air, the channel having a channel inlet and a channel outlet, the channel inlet positioned downstream of the cooling fan and in fluid communication with the pathway so as to receive air flow from the cooling fan, the inner housing defining a sensor aperture; and
  - a sensor positioned in the inner housing, the sensor having a sensing end positioned at the sensor aperture so that air flowing from the channel outlet flows past the sensing end, the sensing end of the sensor downwardly directed toward the cooking surface of the cooktop range appliance positioned beneath the sensor system,
  - wherein the sensor is configured to detect whether a cooking utensil is present on the cooking surface.

2. An appliance as in claim 1, wherein the sensor system further comprises a sensor fan positioned within the chamber adjacent the channel inlet, the sensor fan configured for creating a flow of air through the channel.

3. An appliance as in claim 1, wherein the sensing end of the sensor is downwardly directed toward a cooking surface positioned beneath the appliance.

4. An appliance as in claim 1, wherein the sensor system further comprises a rotatable housing surrounding the inner housing, the rotatable housing being rotatable with respect to the outer housing such that a user of the appliance may manipulate the position of the sensing end of the sensor.

5. An appliance as in claim 1, wherein the inner housing defines an angled inner portion of the channel, and wherein the angled inner portion is at an angle of about 30 to about 60 degrees with respect to the vertical direction.

6. An appliance as in claim 5, wherein the outer housing defines an angled outer portion of the channel, and wherein the angled outer portion is at an angle of about 30 to about 60 degrees with respect to the vertical direction.

7. An appliance as in claim 1, wherein the outer housing is angled relative to the appliance such that the sensing end of the sensor is at a non-orthogonal angle relative to a cooking surface positioned beneath the sensor.

8. An appliance as in claim 1, wherein the sensor is an optical sensor.

9. An appliance as in claim 1, wherein the appliance is a microwave appliance.

10. An appliance as in claim 1, wherein the sensor is configured to detect whether a cooking utensil is present on the cooking surface.

11. An appliance defining vertical, transverse, and lateral directions that are perpendicular to each other, the appliance comprising:

- a cooling air system comprising a pathway for a flow of air for cooling, the pathway having an air inlet and an air outlet;
- a sensor system supported by the appliance, the sensor system and the appliance positioned vertically above a cooking surface of a cooktop range appliance, the sensor system comprising
  - an outer housing defining a chamber, the chamber in fluid communication with the pathway;
  - an inner housing positioned within the chamber, the inner housing and the outer housing defining a channel therebetween for the flow of air, the charnel having a channel inlet and a channel outlet, the channel inlet in fluid communication with the pathway, the inner housing defining a sensor aperture;
  - a sensor positioned in the inner housing, the sensor having a sensing end positioned at the sensor aperture so that air flowing from the channel outlet flows past the sensing end, the sensing end of the sensor downwardly directed toward the cooking surface of the cooktop range appliance positioned beneath the sensor system; and
  - a sensor fan positioned within the chamber adjacent the channel inlet, the sensor fan positioned vertically above the channel inlet and the sensor, the sensor fan configured for creating a flow of air through the channel,
  - wherein the sensor is configured to detect whether a cooking utensil is present on the cooking surface.

12. An appliance as in claim 11, wherein the cooling air system further comprises a cooling fan configured for causing air to flow along the pathway from the air inlet to the air outlet, and wherein the channel inlet is positioned downstream of the cooling fan.

13. An appliance as in claim 11, wherein the sensor system further comprises a rotatable housing surrounding the inner housing, the rotatable housing being rotatable with respect to the outer housing such that a user of the oven appliance may manipulate the position of the sensing end of the sensor.

14. An appliance as in claim 11, wherein the inner housing defines an angled inner portion of the channel, and wherein the angled inner portion is at an angle of about 30 to about 60 degrees with respect to the vertical direction.

15. An appliance as in claim 14, wherein the outer housing defines an angled outer portion of the channel, and wherein the angled outer portion is at an angle of about 30 to about 60 degrees with respect to the vertical direction.

16. An appliance as in claim 11, wherein the outer housing is angled relative to the appliance such that the sensing end of the sensor is at a non-orthogonal angle relative to a cooking surface positioned beneath the sensor.

17. An appliance as in claim 11, wherein the sensor is an optical sensor.

18. An appliance as in claim 11, wherein the appliance is a microwave appliance.

19. An appliance defining vertical, transverse, and lateral directions that are perpendicular to each other, the appliance comprising:

- a cooling air system comprising
  - a pathway for a flow of air for cooling, the pathway having an air inlet and an air outlet; and
  - a cooling fan configured for causing air to flow along the pathway from the air inlet to the air outlet;
- a sensor system supported by the appliance, the sensor system and the appliance positioned vertically above a cooking surface of a cooktop range appliance, the sensor system comprising
  - an outer housing defining a chamber, the chamber in fluid communication with the pathway;
  - a rotatable housing positioned within the chamber, the rotatable housing in fluid communication with the chamber, the rotatable housing also being rotatable with respect to the outer housing;
  - an inner housing positioned within the rotatable housing, the inner housing and the rotatable housing defining a channel therebetween for a flow of air, the channel having a channel inlet and a channel outlet, the channel inlet positioned downstream of the cooling fan and in fluid communication with the pathway so as to receive air flow from the cooling fan, the inner housing defining a sensor aperture; and
  - a sensor positioned in the inner housing, the sensor having a sensing end positioned at the sensor aperture so that air flowing from the channel outlet flows past the sensing end, the sensing end of the sensor downwardly directed toward the cooking surface of the cooktop range appliance positioned beneath the sensor system,
  - wherein the sensor is configured to detect whether a cooking utensil is present on the cooking surface.

* * * * *